United States Patent
Morishima et al.

(10) Patent No.: US 9,178,211 B2
(45) Date of Patent: Nov. 3, 2015

(54) METHOD OF PRODUCING ELECTRODE AND METHOD OF PRODUCING NONAQUEOUS ELECTROLYTE BATTERY

(75) Inventors: Hideaki Morishima, Ichikawa (JP); Hiroki Inagaki, Kawasaki (JP); Hidesato Saruwatari, Saku (JP); Shinsuke Matsuno, Kashiwa (JP); Yumi Fujita, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 771 days.

(21) Appl. No.: 11/928,377

(22) Filed: Oct. 30, 2007

(65) Prior Publication Data

US 2008/0102196 A1    May 1, 2008

(30) Foreign Application Priority Data

Oct. 31, 2006    (JP) ................. 2006-297177

(51) Int. Cl.
| | | |
|---|---|---|
| B05D 5/12 | (2006.01) | |
| H01M 4/1391 | (2010.01) | |
| H01M 4/131 | (2010.01) | |
| B05C 5/02 | (2006.01) | |
| H01M 4/02 | (2006.01) | |

(52) U.S. Cl.
CPC ............ *H01M 4/1391* (2013.01); *H01M 4/131* (2013.01); *B05C 5/0254* (2013.01); *H01M 2004/021* (2013.01); *Y02E 60/122* (2013.01)

(58) Field of Classification Search
USPC ......................................................... 427/58
See application file for complete search history.

(56) References Cited

U.S. PATENT DOCUMENTS

| | | | | |
|---|---|---|---|---|
| 5,316,556 | A * | 5/1994 | Morris | 29/623.3 |
| 5,348,660 | A * | 9/1994 | Fujikata | 210/767 |
| 2001/0001454 | A1 * | 5/2001 | Pressley et al. | 210/608 |
| 2002/0064087 | A1 * | 5/2002 | Catalfamo et al. | 366/337 |
| 2003/0124211 | A1 * | 7/2003 | Isayev et al. | 425/174.2 |
| 2005/0035153 | A1 * | 2/2005 | Brown | 222/145.6 |
| 2005/0130041 | A1 * | 6/2005 | Fensore, III | 429/229 |
| 2005/0191550 | A1 * | 9/2005 | Satoh et al. | 429/217 |
| 2005/0221188 | A1 * | 10/2005 | Takami et al. | 429/231.95 |
| 2005/0271940 | A1 * | 12/2005 | Fukunaga et al. | 429/217 |

FOREIGN PATENT DOCUMENTS

| | | | |
|---|---|---|---|
| JP | 6-79215 | 3/1994 | |
| JP | 11-185735 | 7/1999 | |
| JP | 11185735 | * 7/1999 | |
| JP | 11/185735 | * 9/1999 | H01M 4/04 |
| JP | 2002-301417 | 10/2002 | |
| JP | 2004-321969 | 11/2004 | |
| JP | 2005-11657 | 1/2005 | |
| JP | 2005-243581 | 9/2005 | |
| JP | 2006-156232 | 6/2006 | |

OTHER PUBLICATIONS

JP11185735, Jul. 1999 Machine Translation.*
"Yield stress measurements of aqueous foams in dry limit" B.S. Gardiner, B.Z. Dlugogorski, and G.J. Jameson. ARC Center for Multiphase Proceses, Departmens of Chemical Engineering. The University of NEwcastle, Callaghan NSW 2308, Austrailia. (1998).*

* cited by examiner

*Primary Examiner* — Austin Murata
(74) *Attorney, Agent, or Firm* — Oblon, McClelland, Maier & Neustadt, L.L.P.

(57) ABSTRACT

A method of producing an electrode including decreasing a yield stress of a slurry containing an active material to two-thirds or less, and applying the slurry to a current collector.

25 Claims, 7 Drawing Sheets

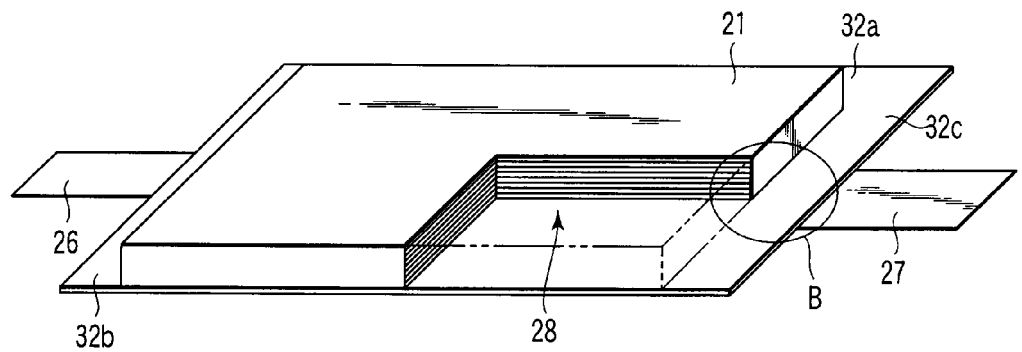
F I G. 7
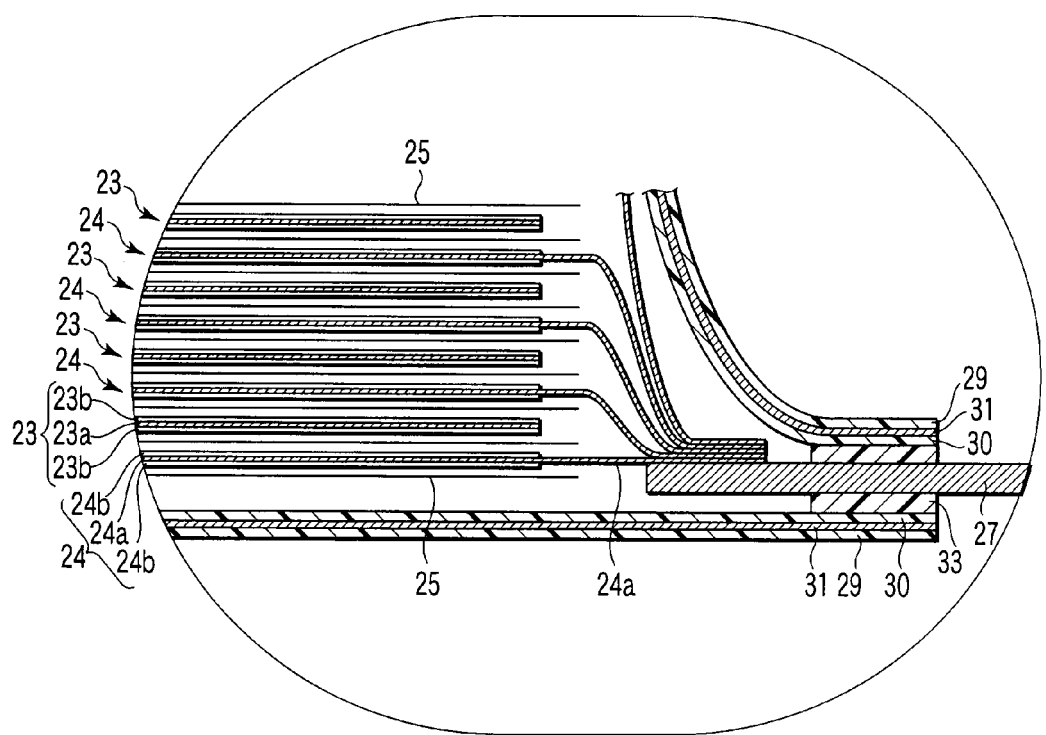
F I G. 8

METHOD OF PRODUCING ELECTRODE AND METHOD OF PRODUCING NONAQUEOUS ELECTROLYTE BATTERY

CROSS-REFERENCE TO RELATED APPLICATIONS

This application is based upon and claims the benefit of priority from prior Japanese Patent Application No. 2006-297177, filed Oct. 31, 2006, the entire contents of which are incorporated herein by reference.

BACKGROUND OF THE INVENTION

1. Field of the Invention

The present invention relates to a method of producing an electrode and also to a method of producing a nonaqueous electrolyte battery.

2. Description of the Related Art

A remarkable attention is currently focused on nonaqueous electrolyte batteries having a high energy density as power sources for hybrid electric vehicles and as accumulators for generators using natural energy such as solar light and wind power. In these applications, changes in the amount of power generation and load as a function of time are abrupt and therefore, secondary batteries having high ability in fast charge and discharge of large current, that is, a large-current performance are required.

In order to cope with such a requirement, technical developments for improving the large-current performance of a nonaqueous electrolyte battery are being made. As one example of these techniques, a method using a positive or negative electrode active material having a smaller particle diameter, that is, a larger specific surface area is given. When the specific surface area of the active material is increased, the contact area between the active material and a nonaqueous electrolyte is increased. As a result, lithium ions can be transferred from the active material to the electrolyte with lower resistance, and therefore, battery voltage is not reduced when large current flows, thereby attaining a large-current performance.

Although the inventors of the present invention also have tried to improve the large-current performance of a battery by repeated contrivance to reduce the size of a particle of the active material, this, on the other hand, gives rise to new problems as the size of a particle decreases. In a process for producing an electrode of a nonaqueous electrolyte battery, first, an active material is suspended, together with a conductive agent and a binder, in a nonaqueous solvent to prepare a slurry. When this slurry was applied to a current collector used as a support through a die coater, the thickness of the coating was not fixed but became non-uniform. In an electrode in which the coating amount is non-uniform like this, current is concentrated on a part decreased in coating amount when flowing large current, with the result that only the part on which current is concentrated deteriorates quickly. As a result, this promotes deterioration of the capacity of the nonaqueous electrolyte battery and at the same time, increases electric resistance, causing a reduction in large-current performance.

JP-A 2004-321969 (KOKAI) relates to a coating apparatus in which a coating solution is continuously supplied from the central part of an extrusion type die coater. This invention intends to try to eliminate uneven thickness of a coating film and surface lines. JP-A 2004-321969 (KOKAI) is provided with at least one stirrer in a place where a coating solution is supplied to the die coater. And the aforementioned at least one stirrer is arranged between the part connecting a coating solution tank with a supply pipe and the distribution section of the die coater. Specifically, in the example, a stirrer is disposed at a position adjacent to the inside or outside of the supply port of the die coater. In this case, as the stirrer, a static mixer or a mesh filter is used.

Meanwhile, in the coating apparatus described in JP-A 2002-301417 (KOKAI), coating solutions stored in two supply tanks, that is, an A supply tank 18 and a B supply tank 19 respectively are mixed with each other and the obtained mixture solution is applied to a support 1 by using an extrusion die coater 4. The A supply tank 18 and the B supply tank 19 each have a feeder pump 10. A static mixer 20 is disposed between the extrusion die coater 4 and the feeder pump 10 to thereby mix the coating solution contained in the A supply tank 18 with the coating solution contained in the B supply tank 19 in the static mixer 20.

BRIEF SUMMARY OF THE INVENTION

According to a first aspect of the present invention, there is provided a method of producing an electrode, comprising:
decreasing a yield stress of a slurry containing an active material to two-thirds or less; and
applying the slurry to a current collector.

According to a second aspect of the present invention, there is provided a method of producing a nonaqueous electrolyte battery including a positive electrode, a negative electrode and a nonaqueous electrolyte,
wherein at least one of the positive and negative electrodes is produced by a method comprising:
decreasing a yield stress of a slurry containing an active material to two-thirds or less; and
applying the slurry to a current collector.

BRIEF DESCRIPTION OF THE SEVERAL VIEWS OF THE DRAWING

FIG. 7 is a partially broken perspective view showing another nonaqueous electrolyte battery produced by a method according to an embodiment;

FIG. 8 is a partial sectional schematic view showing the detail of the part enclosed by a circle shown by B in FIG. 7;

DETAILED DESCRIPTION OF THE INVENTION

Figure 1:
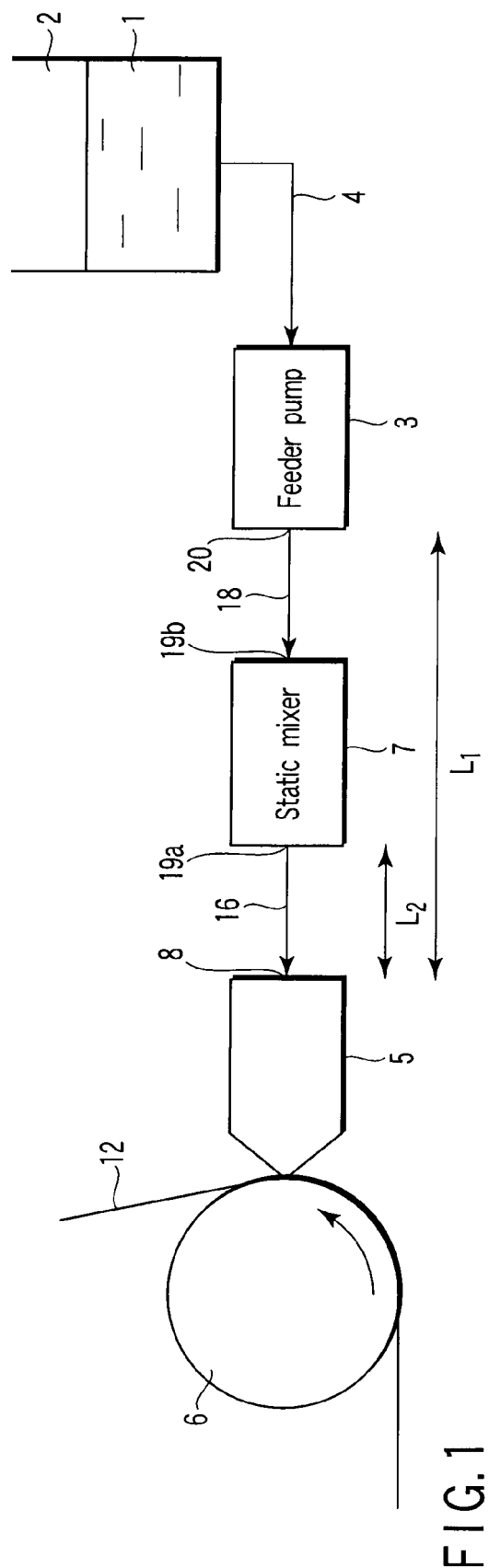
FIG. 1 is a schematic view showing the outline of a slurry coating apparatus according to an embodiment.

The inventors of the present invention have proceeded with studies and as a result, found the following fact. Specifically, the inventors have found that in a coating apparatus in which a slurry is applied to a sheet-like support by using a die coater, one of the reasons for causing a non-uniform coating amount is that the yield stress of the slurry ejected from the die coater is uneven. Namely, the inventors have found that a part of the slurry has a high yield stress, another part has a low yield stress and the slurry includes these parts. When these parts are simultaneously ejected from the die coater, the difference in yield stress magnifies unevenness in the flow easiness of the slurry, with the result that this adversely affects the state of the spread of the slurry after being applied, causing a non-uniform coating amount.

The inventors of the present invention have found that the uniformity of coating amount of a slurry can be improved by applying the slurry to a current collector after the yield stress of the slurry is decreased to two-thirds or less, thereby producing a nonaqueous electrolyte battery which is reduced in a rise of internal electric resistance when a charge-discharge operation is repeated under a large current.

The reason why the yield stress of a slurry after it is reduced is designed to be two-thirds or less when the yield stress before it is reduced is 1 will be explained. When the yield stress after being reduced exceeds two-thirds, two causes are considered. One cause arises in the case where a yield stress regulator used to reduce the yield stress of the slurry has insufficient capacity. In this case, because the yield stress is insufficiently reduced, a part of the slurry is ejected in a state keeping a high yield stress and another part of the slurry is ejected in a state having a low yield stress at the same time. Therefore, a difference in yield stress causes uneven flow easiness of the slurry, with the result that this adversely affects the condition of extension of the slurry, leading to uneven coating amount. Therefore, it is said to be desired that the yield stress regulator have sufficient ability and the yield stress of the slurry after it passes through the yield stress regulator be ⅔ or less of that obtained before the slurry passes. Another cause arises in the case where, as the fundamental nature of the slurry, the slurry has a small difference in yield stress before and after it passes through the yield stress regulator. In this case, the unevenness in coating amount caused by the simultaneous ejection of these slurries differing in yield stress is originally small. Therefore the effect obtained by adopting the method according to the embodiment is small.

In order to improve the uniformity in the coating amount of the slurry, the yield stress of the slurry when it is applied to a current collector preferably satisfies the following equation (I).

$$0 \leq \{(X3-X2)/(X1-X2)\} \times 100 \leq 20 \quad (I)$$

Here, X1 is the yield stress of the slurry before the slurry is passed through the yield stress regulator, X2 is the yield stress of the slurry after the slurry is passed through the yield stress regulator and X3 is the yield stress of the slurry when the slurry ejected from the die coater is applied to the current collector.

Because a dispersion of yield stress in the die coater can be more reduced when the value (hereinafter referred to as "A") calculated from the equation (I) is designed to be 0 or more and 20 or less, uniformity in the coating amount of the slurry can be more improved. The value given by the above equation (I) is preferably 0 or more and 10 or less.

A slurry coater used in the method according to the present invention will be explained with reference to the drawings. Structures common throughout the embodiment are represented by the same symbols and duplicated explanations will be omitted. Also, each drawing is a schematic view for the sake of explanations of the invention and for promoting the understanding of the invention. In these drawings, there are parts differing in, for example, shape, dimension and ratio from those of an actual apparatus. However, each of these parts may be properly changed and modified in design taking the following explanations and known technologies into account.

FIG. 1 shows the outline of a slurry coater according to this embodiment. A slurry 1 is received in a slurry tank 2 used as a slurry receiver. A feeder pump 3 is connected with the slurry tank 2 through a pipe 4. The feeder pump 3 feeds the slurry 1 contained in the slurry tank 2 to a die coater 5. A coating roll 6 is disposed adjacent to the die coater 5. A static mixer 7 as a yield stress regulator is disposed in a slurry supply path extending from the feeder pump 3 to the die coater 5.

Figure 2:
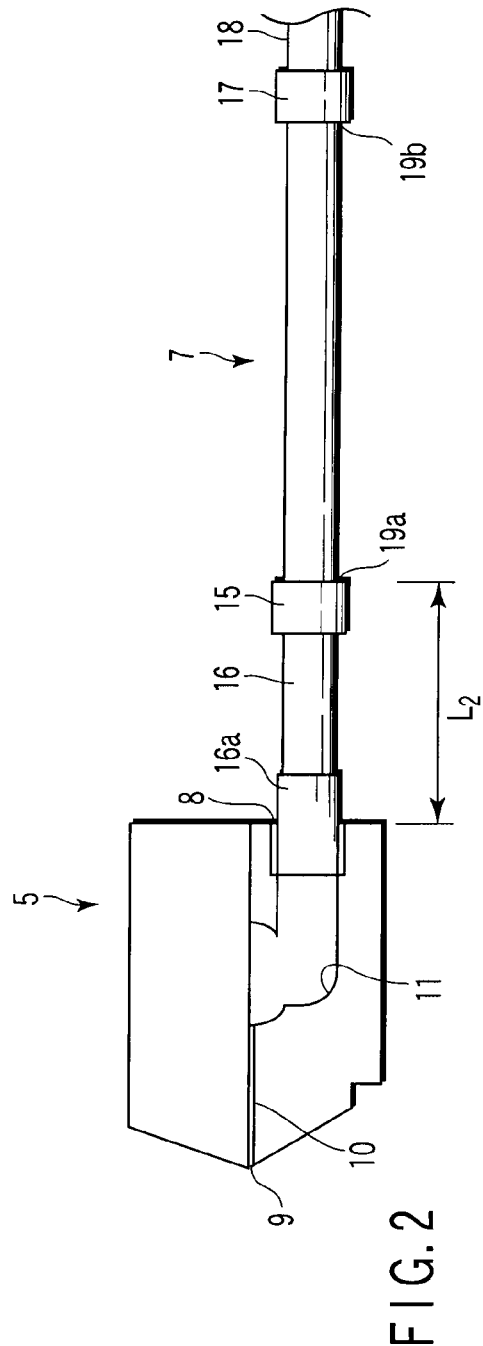
FIG. 2 is a schematic view showing the positional relationship between a die coater and a static mixer in the slurry coating apparatus of FIG. 1.
Figure 3:
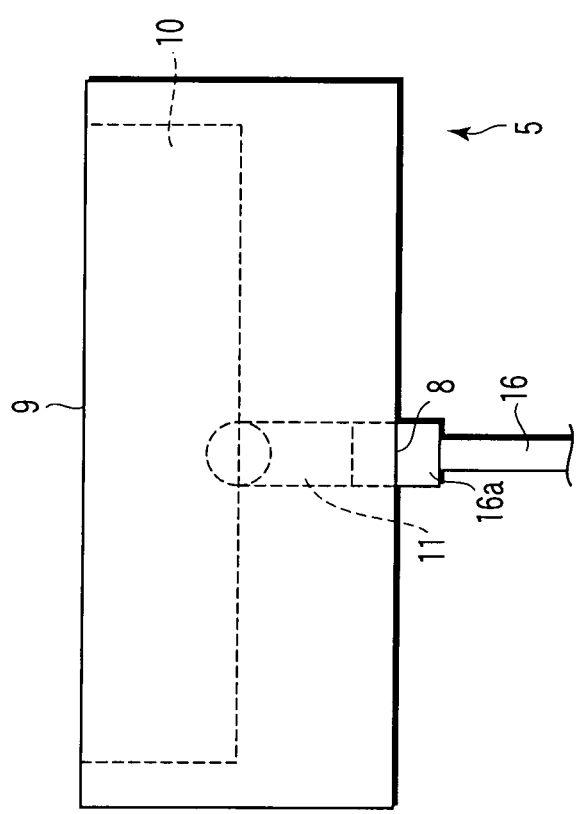
FIG. 3 is a top view showing the positional relationship between the die coater and the static mixer in the slurry coating apparatus of FIG. 1.

FIGS. 2 and 3 show the condition of connection between the die coater 5 and the static mixer 7. FIG. 2 is a side view and FIG. 3 is a plan view. The die coater 5 is of an extrusion type. This die coater 5 is provided with a slurry supply port 8 from which the slurry is to be supplied, a gap part 10 whose tip is a slurry ejection port 9 and a slurry introduction passage 11 that introduces the slurry from the slurry supply port 8 into the gap part 10. The slurry 1 introduced into the gap part 10 from the slurry supply port 8 through the slurry introduction passage 11 is ejected from the slurry ejection port 9 and applied to the surface of a support 12 (for example, a current collector) transferred on a coating roll 6.

Figure 4:
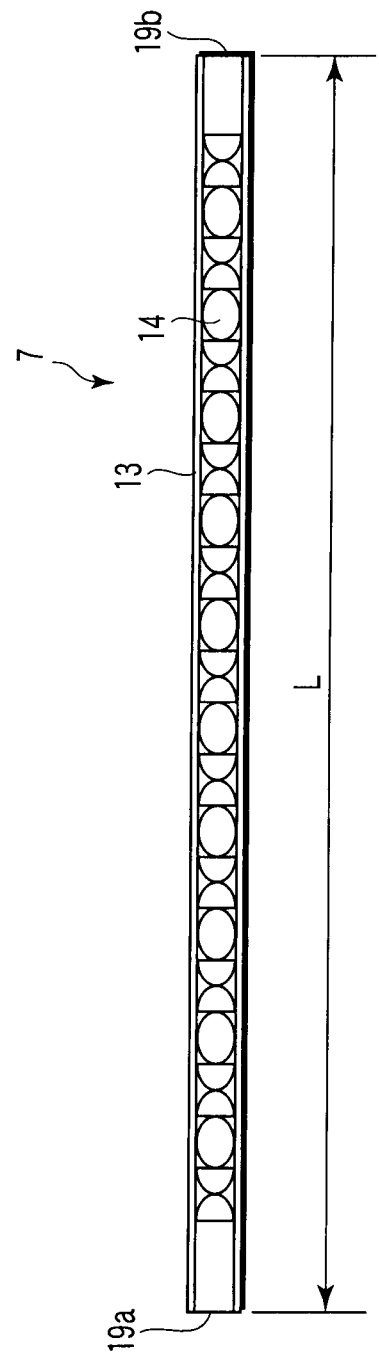
FIG. 4 is a schematic view of the static mixer of FIG. 1.

The static mixer 7 is, as shown in FIG. 4, provided with an outer package tube 13 and an element 14 having a spiral structure and inserted into the outer package tube 13. The yield stress of the slurry 1 can be reduced by making the slurry 1 pass through the inside of the outer package tube 13. The number of blades, diameter and length of the element 14 of the static mixer 7 are designed appropriately to thereby provide sufficient shear and deformation to the slurry, whereby the yield stress can be reduced to two-thirds or less.

In the static mixer 7, a slurry outlet part 19a constituted of one end of the outer package tube 13 is connected to a pipe 16 through a joint 15. A distal end 16a of the pipe 16 is formed with threads on its outside periphery by threading processing and functions as a male screw. On the other hand, the vicinity of the slurry supply port 8 of the slurry introduction passage 11 of the die coater 5 is formed with threads on its inside periphery and functions as a female screw. The distal end 16a of the pipe 16 is screwed into the slurry supply port 8 of the pipe 11 of the die coater 5.

The slurry supply port 19b of the static mixer 7 is connected to the pipe 18 through a joint 17. The pipe 18 is connected to an outlet part 20 of the feeder pump 3. As the joints 15 and 17, for example, a sanitary flange or male/female screw may be used. Also, as the pipes 4, 16 and 18, a tube made of a fluororesin such as polytetrafluoroethylene, tube made of a polyamide such as nylon, SUS tube or the like may be used.

The static mixer 7 is disposed in a slurry supply path extending from the outlet part 20 of the feeder pump 3 to the slurry supply port 8 of the die coater 5 so as to satisfy the following formula (II).

$$(L_2/L_1) \times 100 \leq 5 \tag{II}$$

Here, $L_1$ is the length of the slurry supply path. In this embodiment, $L_1$ is a distance from the outlet part 20 of the feeder pump 3 to the slurry supply port 8 of the die coater 5. $L_2$ is the length of the slurry supply path from the static mixer 7 to the die coater 5. In this embodiment, the length $L_2$ is a distance from the slurry outlet part 19a of the static mixer 7 to the slurry supply port 8 of the die coater 5. The slurry outlet part 20 of the feeder pump 3 is an outlet of a mechanism generating pressure for feeding.

When the value calculated from the equation $(L_2/L_1) \times 100$ exceeds 5, the yield stress reduced by the static mixer 7 increases again during the time since the slurry passes the pipe 16 until the slurry is supplied to the die coater 5 and therefore, the uniformity of the coating amount is not improved. When the value calculated from the equation $(L_2/L_1) \times 100$ is made to be 5 or less, the yield stress X3 of the slurry ejected from the slurry ejection port 9 of the die coater 5 satisfies the above equation (I) and therefore, the slurry can be applied evenly to the support 12 transferred from the slurry ejection port 9 along the coating roll 6. After that, the support 12 is transferred to a dryer where it is dried and is then optionally pressed and cut to obtain an electrode.

When two or more static mixers are used, these mixers are disposed in series in the slurry supply path, it is desirable that the mixer closest to the die coater satisfy the above equation (II).

It is only necessary for the yield stress regulator to reduce the yield stress of the slurry. The yield stress regulator is not limited to the static mixer and an appropriate apparatus may be used as the yield stress regulator. For example, a part of the pipe positioned between the feeder pump and the die coater may be narrowed to give sufficient shearing and deformation to the slurry while the slurry is passed through the narrowed part to thereby reduce the yield stress. Also, a slit in which comb teeth-like clearances are opened may be placed just before the slurry ejection part in the die coater to give sufficient shearing and deformation to the slurry while the slurry is passed through the slit to thereby reduce the yield stress. Also, for example, a mesh filter is used, and at this time, the mesh size and the number of mesh sheets are properly selected to thereby give sufficient shearing and deformation to the slurry while the slurry is passed through the filter to thereby reduce the yield stress. The mesh size of this filter is preferably #100 to #300. When the mesh size is #100 or less, insufficient shearing force is obtained whereas when the mesh size #300 or more, the filter is easily clogged and therefore these cases are both undesirable. Also, the desirable number of mesh sheets is 4 or more and 10 or less. When the number of sheets is less than 4, insufficient shearing force is obtained whereas when the number of sheets exceeds 10, pressure loss when the slurry is fed is large, so that a supply apparatus carries a large burden, and these cases are therefore undesirable.

It is preferable to use a static mixer as the yield stress regulator because it is able to reduce in clogging during feeding.

Also, the yield stress of the slurry before the slurry passes through the yield stress regulator preferably exceeds 50 Pa. When the yield stress is less than 50 Pa, the effect is small because even if the slurry passes through the yield stress regulator and the yield stress of the slurry is reduced to two-thirds or less, the absolute value of a difference in yield stress before and after the slurry passes through the yield stress regulator is small.

In the above slurry coater, X1 is the yield stress of the slurry at the slurry supply port 19b of the static mixer 7, X2 is the yield stress of the slurry at the slurry outlet part 19a of the static mixer 7 and X3 is the yield stress of the slurry when the slurry is ejected from the slurry ejection port 9 of the die coater 5.

Although no particular limitation is imposed on the type of slurry to be applied to the support by using the foregoing slurry coater, preferable examples of the slurry include the one containing an active material for nonaqueous electrolyte batteries. Particularly, a negative electrode active material for nonaqueous electrolyte batteries is preferable.

The average particle diameter of the active material contained in the slurry is preferably 5 μm or less. When the average particle diameter exceeds 5 μm, it is difficult to improve the large-current performance of the nonaqueous electrolyte battery. The average particle diameter is more preferably 1 μm or less. When the average particle diameter is 1 μm or less, the large-current performance is more improved, which is more desirable. However, if the average particle diameter is too small, the distribution of the nonaqueous electrolyte is inclined towards the negative electrode and there is therefore a fear as to the depletion of the electrolyte at the positive electrode. Therefore, the lower limit of the average particle diameter is preferably 0.001 μm.

To measure the average particle diameter, a Laser Diffraction Particle Size Analyzer (trade name: SALD-300, manufactured by Shimadzu Corporation) is used: first, about 0.1 g of a sample, a surfactant and 1 to 2 mL of distilled water are added in a beaker and the mixture is vigorously stirred. Then, the resulting mixture is poured into a stirring water vessel to measure light intensity distribution 64 times at intervals of 2 seconds, thereby analyzing particle diameter distribution data.

The specific surface area measured using the BET method utilizing $N_2$ adsorption of the active material contained in the slurry is preferably 0.5 $m^2$/g or more. When the specific surface area is less than 0.5 $m^2$/g, it is difficult to improve the large-current performance of the nonaqueous electrolyte battery. The specific surface area is more preferably 4 $m^2$/g or more, in which case the large-current performance can be further improved. The upper limit of the specific surface area may be designed to be 50 $m^2$/g. The specific surface area of the active material may be measured using, for example, a Micromelitex ASAP-2010 manufactured by Shimadzu Corporation and $N_2$ as adsorption gas.

The slurry after passing through the yield stress regulator preferably has a viscosity of 1,000 mPa·s or more and 100,000 mPa·s or less when the viscosity is measured at a shear rate of $10^1$ (1/s). If the viscosity is less than 1,000 mPa·s, there is the possibility of liquid sagging after the slurry is applied to the support. Also, if the viscosity exceeds 100,000 mPa·s, pressure in the slurry supply pipe is raised and there is therefore a fear that a load on a slurry coater is raised. The viscosity of the slurry is more preferably 1,000 mPa·s or more and 10,000 mPa·s or less in consideration of a load on the slurry supply apparatus.

The thickness of the electrode layer is preferably 10 μm or more and 130 μm or less. The electrode layer is a coating film obtained by applying a slurry to a current collector by a coater according to the embodiment, followed by drying and pressing. When the thickness of the electrode layer is less than 10 μm, there is a fear as to a reduction in the energy density of a nonaqueous electrolyte battery produced using this electrode layer. Also, when the thickness of the electrode layer exceeds 130 μm, there is a possibility of deterioration of the large-current performance of a nonaqueous electrolyte battery produced using this electrode layer.

The positive electrode and negative electrode for a nonaqueous electrolyte battery will be explained.

(Positive Electrode Slurry and Positive Electrode)

The positive electrode is produced as follows: a positive electrode active material, a positive electrode conductive agent and a binder are suspended in an appropriate solvent to prepare a slurry and then the obtained slurry is applied to a positive electrode current collector, followed by drying and pressing to thereby form a positive electrode layer as an electrode layer on the surface of the positive electrode current collector.

As the positive electrode active material contained in the positive electrode slurry, general lithium-transition metal complex oxides may be used. Examples of the lithium-transition metal complex oxide include $LiCoO_2$, $LiNi_{1-x}CO_xO_2$ ($0<x<0.3$), $LiMn_xNi_yCo_zO_2$ ($0<x<0.5$, $0<y<0.5$, $0 \leq z<0.5$), $LiMn_{2-x}M_xO_4$ (M is one or more elements selected from Li, Mg, Co, Al and Ni, $0<x<0.2$) and $LiMPO_4$ (M is one or more elements selected from Fe, Co and Ni).

Examples of the positive electrode conductive agent that improves current collecting ability and suppresses contact resistance with a current collector include carbonaceous materials such as acetylene black, carbon black and graphite.

Examples of the binder that binds the positive electrode active material with the positive electrode conductive agent include polytetrafluoroethylene (PTFE), polyvinylidene fluoride (PVdF) and fluoro-rubber.

The compounding ratio of the positive electrode active material, positive electrode conductive agent and binder is preferably in the following range: the positive electrode active material: 80% by weight or more and 95% by weight or less, the positive electrode conductive agent: 3% by weight or more and 18% by weight or less, the binder: 2% by weight or more and 17% by weight or less. When the amount of the positive electrode conductive agent is 3% by weight or more, the aforementioned effect can be produced. Also, when the amount of the positive electrode conductive agent is 18% by weight or less, the decomposition of the nonaqueous electrolyte on the surface of the positive electrode conductive agent under a high-temperature storage condition can be limited. When the amount of the binder is 2% by weight or more, satisfactory electrode strength can be obtained. Also, when the amount of the binder is 17% by weight or less, the compounding amount of an insulating material of the electrode can be reduced and therefore, internal resistance can be reduced.

These positive electrode active material, conductive agent and binder are suspended in an appropriate solvent to prepare a slurry. In this case, examples of the solvent include N-methylethylpyrrolidone. The ratio by weight of the total amount of the positive electrode active material, conductive agent and binder to the amount of the solvent is preferably 50:50 to 80:20.

The positive electrode current collector that serves as the support to which the slurry is to be applied is preferably an aluminum foil or an aluminum alloy foil containing one or more elements selected from Mg, Ti, Zn, Mn, Fe, Cu and Si.

(Negative Electrode Slurry and Negative Electrode)

The negative electrode is manufactured in the following manner: for example, a negative electrode active material, a negative electrode conductive agent and a binder are suspended in a common solvent to prepare a slurry, which is then applied to a negative electrode current collector, followed by drying and pressing to form a negative electrode layer as an electrode layer on the negative electrode current collector.

As the negative electrode active material contained in the negative electrode slurry, for example, a titanium-containing complex oxide may be used. Examples of the titanium-containing complex oxide include lithium-titanium oxides and titanium-based oxides that contains no lithium when synthesizing these oxides.

Examples of the lithium-titanium oxide include lithium titanate having a spinel structure or a rhamsdelite structure. Examples of the lithium titanate having the spinel structure include $Li_{4+x}Ti_5O_{12}$ (x changes in the range of $0 \leq x \leq 3$ by a charge-discharge reaction). Examples of the lithium titanate having the rhamsdelite structure include $Li_{2+y}Ti_3O_7$ (y changes in the range of $0 \leq y \leq 3$ by a charge-discharge reaction).

Examples of the titanium-based oxide include $TiO_2$ and metal complex oxides containing Ti and at least one element selected from the group consisting of P, V, Sn, Cu, Ni, Co and Fe. $TiO_2$ is preferably an anatase type and a less crystalline one that is thermally treated at 300 to 500° C. Examples of the metal complex oxide containing Ti and at least one element selected from the group consisting of P, V, Sn, Cu, Ni, Co and Fe may include $TiO_2$—$P_2O_5$, $TiO_2$—$V_2O_5$, $TiO_2$—$P_2O_5$—$SnO_2$ and $TiO_2$—$P_2O_5$-MeO (Me is at least one element selected from the group consisting of Cu, Ni, Co and Fe). This metal complex oxide preferably has a microstructure in which a crystal phase and an amorphous phase coexist or an amorphous phase singly exists. Such a microstructure makes it possible to significantly improve cycle performance.

Among the aforementioned negative electrode active materials, lithium-titanium oxides and metal complex oxides containing Ti and at least one element selected from the group consisting of P, V, Sn, Cu, Ni, Co and Fe are preferable. Lithium-titanium oxides are most preferable.

Examples of the negative electrode conductive agent may include acetylene black, carbon black and graphite.

Examples of the binder that binds the negative electrode active material with the negative electrode conductive agent include polytetrafluoroethylene (PTFE), polyvinylidene fluoride (PVdF), fluorine type rubber and styrene-butadiene rubber.

With regard to the compounding ratio of the negative electrode active material, the negative electrode conductive agent and the binder, each preferable range is as follows: the negative electrode active material: 70% by weight or more and 96% by weight or less, the negative electrode conductive agent: 2% by weight or more and 28% by weight or less and the binder: 2% by weight or more and 28% by weight or less. When the amount of the negative electrode conductive agent is less than 2% by weight, the current collecting performance of the negative electrode layer deteriorates and the large-current performance of the nonaqueous electrolyte battery deteriorates. Also, when the amount of the binder is less than 2% by weight, the binding ability between the negative electrode layer and the negative electrode current collector deteriorates and the cycle performance are reduced. On the other hand, the amounts of the negative electrode conductive agent and the binder are respectively preferably 28% by weight or less from the viewpoint of developing a high-capacity battery.

These negative electrode active material, conductive agent and binder are suspended in an appropriate solvent to prepare a slurry. In this case, examples of the solvent include N-methylethylpyrrolidone. The ratio by weight of the total amount of the negative electrode active material, conductive agent and binder to the amount of the solvent is preferably 50:50 to 80:20.

The negative electrode current collector that serves as the support to which the slurry is to be applied is preferably an aluminum foil or an aluminum alloy foil containing one or more elements selected from Mg, Ti, Zn, Mn, Fe, Cu and Si. A current collector consisting of these materials is electrochemically stable in a potential range higher than 1.0 V.

An embodiment of the nonaqueous electrolyte battery produced by a method according to this embodiment is shown in FIGS. 5 to 9.

Figure 5:
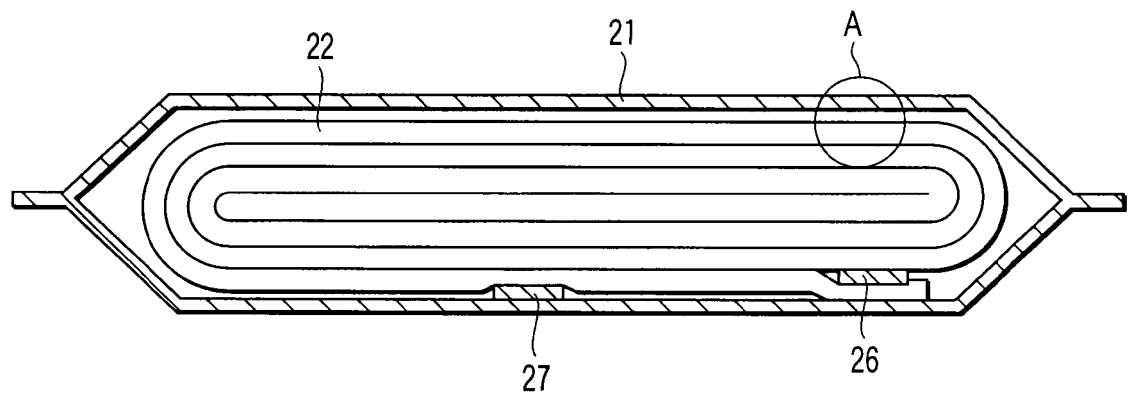
FIG. 5 is a sectional schematic view of a nonaqueous electrolyte battery produced by a method according to an embodiment.

As shown in FIG. 5, a flat-form coiled electrode group 22 is stored in an outer package member 21. The coiled electrode group 22 has a structure in which a positive electrode 23 and a negative electrode 24 are spirally coiled with a separator 25 interposed therebetween. A nonaqueous electrolyte is retained by the coiled electrode group 22.

Figure 6:
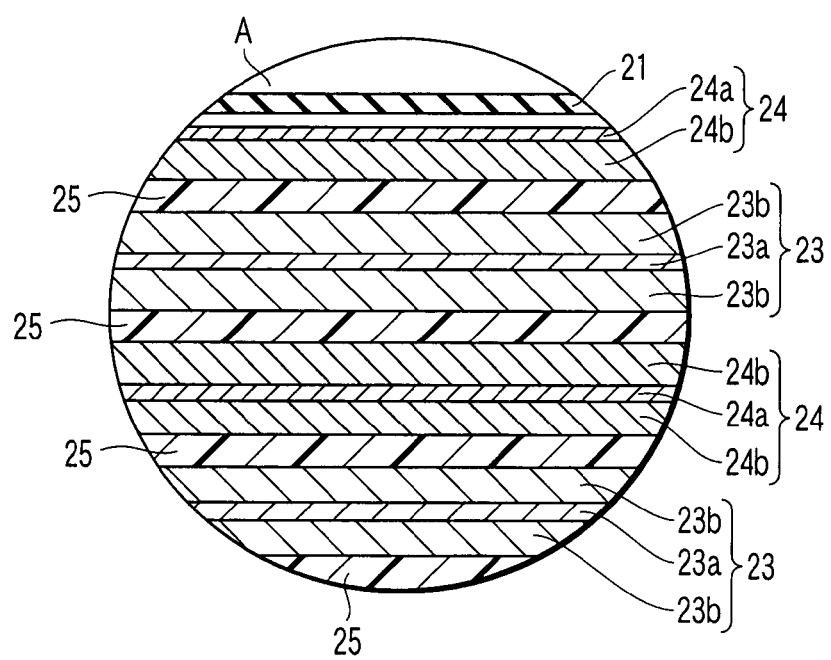
FIG. 6 is a partial sectional schematic view showing the detail of the part enclosed by a circle shown by A in FIG. 5.

As shown in FIG. 6, the negative electrode 24 is positioned on the outermost periphery of the coiled electrode group 22, and each positive electrode 23 and each negative electrode 24 are alternately laminated with each separator 25 interposed therebetween in such a manner that on the inside periphery of the negative electrode 24, a separator 25, positive electrode 23, separator 25, negative electrode 24, separator 25, positive electrode 23, separator 25, . . . are laminated in this order. The negative electrode 24 comprises a negative electrode current collector 24a and a negative electrode active material-containing layer 24b supported by the negative electrode current collector 24a. The negative electrode active material-containing layer 24b is formed on only one surface of the negative electrode current collector 24a at the part positioned on the outermost periphery of the electrode group 22. The positive electrode 23 comprises a positive electrode current collector 23a and a positive electrode active material-containing layer 23b supported by the positive electrode current collector 23a.

As shown in FIG. 5, a band-shaped positive electrode terminal 26 is electrically connected to the positive electrode current collector 23a in the vicinity of the outer peripheral end of the coiled electrode group 22. On the other hand, a band-shaped negative electrode terminal 27 is electrically connected to the negative electrode current collector 24a in the vicinity of the outer peripheral end of the coiled electrode group 22. Each end of the positive electrode terminal 26 and negative electrode terminal 27 is drawn externally from the same side of the outer package member 21.

In the above FIGS. 5 and 6, an example using a flat-form coiled electrode group is explained. However, no particular limitation is imposed on the structure of the electrode group and for example, a laminate-type electrode group illustrated in FIGS. 7 and 8 may be used.

As shown in FIG. 7, a laminate-type electrode group 28 is stored in an outer package member 21 made of a laminate film. As shown in, for example, FIG. 8, the laminate film comprises a resin layer 29, a thermoplastic resin layer 30 and a metal layer 31 disposed between the resin layer 29 and the thermoplastic resin layer 30. The thermoplastic resin layer 30 is positioned inside the outer package member 21. Heat seal parts 32a, 32b and 32c are formed by thermal fusion of the thermoplastic resin layer 30 on one long side and both short sides of the outer package member 21 made of a laminate film. The outer package member 21 is sealed by these heat seal parts 32a, 32b and 32c.

The laminate-type electrode group 28 comprises plural positive electrodes 23, plural negative electrodes 24 and separators 25 interposed between each positive electrode 23 and each negative electrode 24. The laminate-type electrode group 28 has a structure in which the positive electrode 23 and the negative electrode 24 are alternately laminated with the separator 25 interposed therebetween as shown in FIG. 8.

Each positive electrode 23 comprises a positive electrode current collector 23a and a positive electrode active material-containing layer 23b supported on both surfaces of the positive electrode current collector 23a. Each negative electrode 24 comprises a negative electrode current collector 24a and a negative electrode active material-containing layer 24b supported on both surfaces of the negative electrode current collector 24a. One short side of each of the negative electrode current collectors 24a of the negative electrodes 24 is projected from the positive electrode 23. The negative electrode current collector 24a projected from the positive electrode 23 is electrically connected to a band-like negative electrode terminal 27. The end of the band-like negative electrode terminal 27 is drawn externally through the heat seal part 32c of the outer package member 21. In order to improve the binding strength between the heat seal part 32c and the negative electrode terminal 27, an insulating film 33 is interposed between each surface of the negative electrode terminal 27 and the thermoplastic resin layer 30. Examples of the insulating film 33 may include films formed from materials obtained by adding an acid anhydride to polyolefin containing at least one of polypropylene and polyethylene.

Although not shown here, one short side of each of the positive electrode current collectors 23a of the positive electrodes 23 is projected from the negative electrode 24. The positive electrode current collector 23a and the negative electrode current collector 24a are projected in directions opposite to each other. The positive electrode current collector 23a projected from the negative electrode 24 is electrically connected to the band-like positive electrode terminal 26. The end of the band-like positive electrode terminal 26 is drawn externally through the heat seal part 32b of the outer package member 21. In order to improve the binding strength between the heat seal part 32b and the positive electrode terminal 26, an insulating film 33 is interposed between the positive electrode terminal 26 and the thermoplastic resin layer 30. The positive electrode terminal 26 and the negative electrode terminal 27 are drawn in directions opposite to each other from the outer package member 21.

Figure 9:
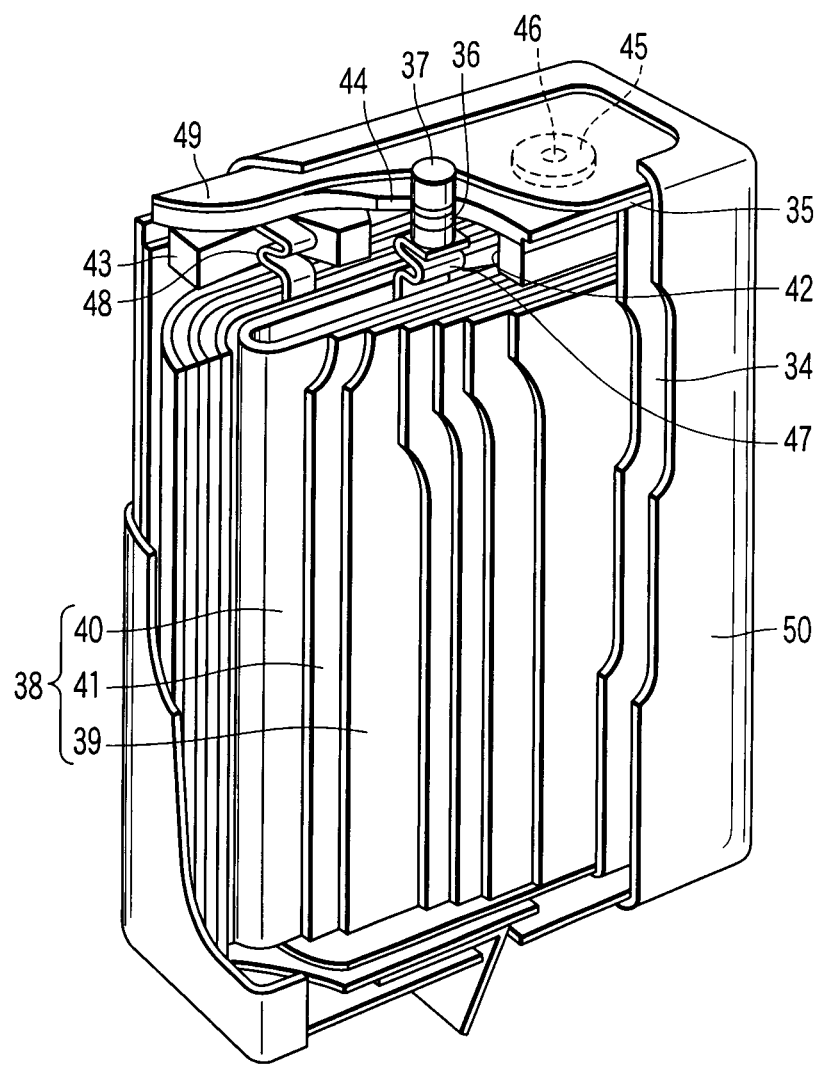
FIG. 9 is a partially broken perspective view showing another nonaqueous electrolyte battery produced by a method according to an embodiment.

The nonaqueous electrolyte battery according to this embodiment is not limited to those using a laminate film container as illustrated in FIGS. 5 to 8 but may have a structure using a metal container as illustrated in FIG. 9.

The outer package member is provided with a bottomed container 34 which is made of aluminum or an aluminum alloy and has an angular cylinder form, a lid 35 disposed at the opening part of the container 34 and a negative electrode terminal 37 attached to the lid 35 through an insulating material 36. In this case, the container 34 doubles as a positive terminal.

An electrode group 38 is stored in the container 34. The electrode group 38 has a structure in which a positive electrode 39 and a negative electrode 40 are coiled with a separator 41 interposed therebetween in a flat form. This electrode group 38 is obtained in the following manner: for example, a band-like product obtained by laminating the positive electrode 39, the separator 41 and the negative electrode 40 in this order is coiled in a spiral form by using a plate or cylindrical core such that the positive electrode 39 is positioned on the outside and the obtained coiled product is pressed in the direction of the diameter.

The nonaqueous electrolyte solution (liquid nonaqueous electrolyte) is retained by an electrode group 38. A spacer 43 which is provided with a lead-hole 42 in the vicinity of the center thereof and made of, for example, a synthetic resin is disposed on the electrode group 38 of the container 34.

A hole 44 for the negative electrode terminal 37 is opened in the vicinity of the center of the lid 35. A liquid injection port 45 is formed at a position apart from the hole 44 of the lid 35. The liquid injection port 45 is sealed with a seal plug 46 after the nonaqueous electrolyte solution is injected into the container 34. The negative electrode terminal 37 is hermetically sealed in the hole 44 of the lid 35 through a glass or resin insulating material 36.

A negative electrode lead tab 47 is welded to the lower bottom surface of the negative electrode terminal 37. The negative electrode lead tab 47 is electrically connected to the negative electrode 40. One end of the positive electrode lead 48 is electrically connected to the positive electrode 39 and the other end thereof is welded to the backside of the lid 35. An insulating paper 49 covers the entire outer surface of the lid 35. An outer package tube 50 covers the entire side surface of the container 34, and the upper and lower ends of the tube 50 are folded onto the upper and lower surfaces of the battery body, respectively.

The nonaqueous electrolyte, the separator and the outer package member will be explained.

(Nonaqueous Electrolyte)

Examples of the nonaqueous electrolyte include a liquid nonaqueous electrolyte obtained by dissolving an electrolyte in an organic solvent and a gel nonaqueous electrolyte obtained by forming a complex of a liquid nonaqueous electrolyte and a polymer material.

The liquid nonaqueous electrolyte is prepared by dissolving an electrolyte in an organic solvent in a concentration of 0.5 mol/l or more and 2.5 mol/l or less.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethasulfonate ($LiCF_3SO_3$) and bistrifluoromethylsulfonylimide lithium [$LiN(CF_3SO_2)_2$] or mixtures of these compounds. Materials resistant to oxidation under a high voltage are preferable and $LiPF_6$ is most preferable.

Examples of the organic solvent include cyclic carbonates such as propylene carbonate (PC), ethylene carbonate (EC) and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL); acetonitrile (AN); and sulfolane (SL), which may be used singly or in combinations of two or more.

Examples of the polymer material may include polyvinylidene fluoride (PVdF), polyacrylonitrile (PAN) and polyethylene oxide (PEO).

As the nonaqueous electrolyte, an ionic liquid containing lithium ions, polymer solid electrolyte, inorganic solid electrolyte or the like may be used.

The ionic liquid indicates compounds which exist in the form of a liquid at room temperature (15° C. to 25° C.) among organic salts constituted of combinations of organic cations and anions. Examples of the ionic liquid include ionic liquids existing singly, ionic liquids put into a liquid state when mixed with an electrolyte and ionic liquids put into a liquid state when mixed in an organic solvent. Generally, the melting point of an ionic liquid used in nonaqueous electrolyte batteries is 25° C. or less. Also, organic cations have a quaternary ammonium skeleton in general.

The polymer solid electrolyte is prepared by dissolving an electrolyte in a polymer material and solidifying.

The inorganic solid electrolyte is a solid material having lithium ion-conductivity.

(Separator)

Examples of the separator may include porous films containing polyethylene, polypropylene, cellulose or polyvinylidene fluoride (PVdF) and synthetic resin nonwoven fabrics. Among these compounds, porous films made of polyethylene or polypropylene are melted at a fixed temperature, are able to interrupt current and are preferable from the viewpoint of improving safety.

(Outer Package Member)

Examples of the outer package member include laminate film containers having a wall thickness of 0.2 mm or less and metal containers having a wall thickness of 0.5 mm or less. The wall thickness of the metal container is more preferably 0.2 mm or less.

Examples of the shape of the outer package member include a flat type, angular type, cylinder type, coin type, button type, sheet type and laminate type. The outer package member may have a size suitable to small-sized batteries to be mounted on portable electronic devices and a size suitable to large-sized batteries to be mounted on vehicles such as motor cycles and four-wheeled vehicles.

The laminate film is a multilayer film constituted of a metal layer and a resin layer covering the metal layer. The metal layer is preferably an aluminum foil or an aluminum alloy foil to lighten the film. The resin layer serves to reinforce the metal layer, and as the resin layer, a polymer such as polypropylene (PP), polyethylene (PE), nylon or polyethylene terephthalate (PET) may be used. The laminate film container is formed by carrying out sealing by thermal fusion.

Examples of the material of the metal container include aluminum and aluminum alloys. As the aluminum alloy, alloys containing elements such as magnesium, zinc and silicon are preferable. On the other hand, the content of transition metals such as iron, copper, nickel and chromium is preferably 1% or less. This makes it possible to outstandingly improve long-term reliability under high-temperature circumstances and radiation ability.

Examples will be explained hereinbelow. However, the present invention is not limited to the examples described below as long as it is within the concepts of the present invention.

EXAMPLE 1

As a solvent, NMP (N-methylethyl pyrrolidone) was prepared. Lithium titanate which was a nonaqueous electrolyte battery active material and had an average particle diameter of 0.9 μm and a specific surface area of 8 $m^2/g$, graphite and PVdF were dispersed in the solvent to prepare a slurry. The proportion of lithium titanate, graphite and PVdF was 100:10:3. The ratio by weight of the total amount of lithium titanate, graphite and PVdF to NMP was 60:40.

The manufactured slurry was allowed to stand at ambient temperature for one day or more and three days or less. After that, the viscosity and yield stress of the slurry were measured to find that the viscosity and yield stress were 2300 mPa·s and 200 Pa, respectively. The results are shown in Table 1.

In the slurry coater shown in the above FIG. 1, the value calculated from the equation, $\{(L_2/L_1) \times 100\}$ was set to 1. The slurry 1 was stored in a slurry receiving container 2 of the slurry coater and supplied to a feeder pump 3 through a pipe 4. The slurry 1 was fed to a static mixer 7 by the feeder pump 3 through a pipe 18 and made to pass through the inside of an outer package tube 13 of the static mixer 7 to reduce the yield stress of the slurry 1. The feeding speed at this time was 10 g/min. Then, the yield stress X2 of the slurry 1 at a slurry outlet part 19a of the static mixer 7 was measured to find that it was reduced to 90 Pa. The results are shown in Table 1. The yield stress X1 of the slurry 1 at a slurry supply port 19b of the static mixer 7 was 200 Pa. The value calculated from the equation (X2/X1) is shown as a reduction rate in Table 1.

The slurry 1 that passed through the static mixer 7 was supplied to a die coater 5 from the slurry supply port 8 through a pipe 16. Then, the slurry 1 was fed to a gap 10 from an introduction passage 11, ejected from a slurry ejection port 9 and applied to an aluminum foil having a uniform thickness, followed by drying. The dried coating film had a thickness of 30 μm. The yield stress X3 of the slurry 1 was 90 Pa when the slurry 1 was applied to the aluminum foil after passed through the slurry ejection port 9. Therefore, the value of A in the formula (I) (A={(X3−X2)/(X1−X2)}) was 0.

Then, the coating amount (weight per unit area) of the dried coating film was measured. As a result, a difference between the maximum and minimum of the coating amount was 2.7 g/m². The difference between the maximum and minimum at this time is shown in Table 1 as the standard of flatness.

Next, the methods of measuring the viscosity, yield stress and coating amount of the slurry 1 will be explained.

The viscosity and yield stress were measured using Viscoelasticity Measuring Device RS-600 manufactured by HAAKE. Parallel plates having a diameter of 35 mm were used and measuring temperature was set to 25° C. The slurry 1 was measured by setting the plate interval to 0.1 mm when measuring the viscosity and to 0.5 mm when measuring the yield stress.

Figure 10:
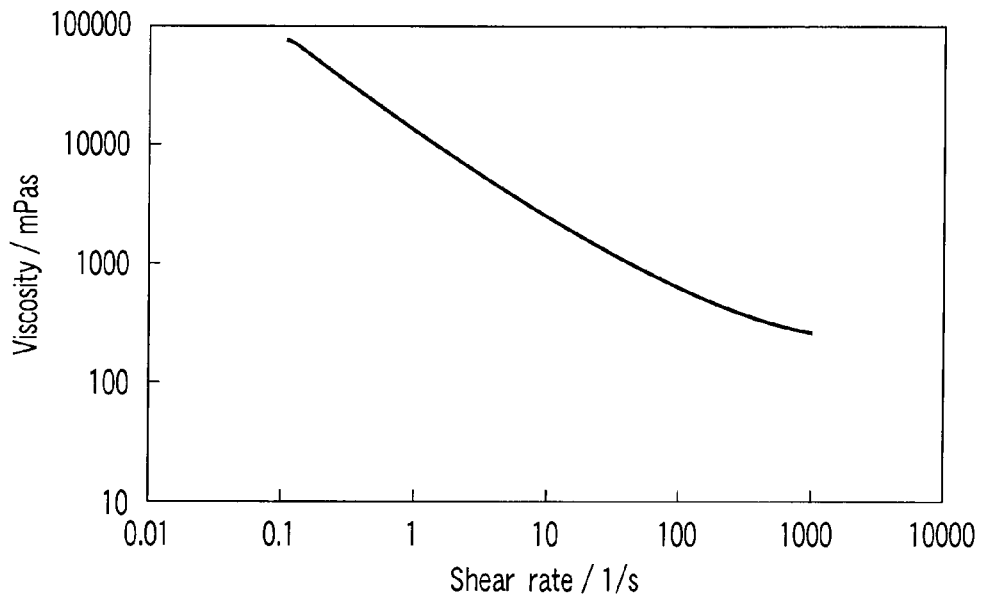
FIG. 10 is a characteristic view showing the relationship between the shear rate and viscosity of a slurry in Example 1.

The method of measuring the viscosity will be explained. In order to measure the viscosity in the condition that the yield stress of the slurry is reduced enough, the measurement was made according to the following procedures. First, the slurry was placed on a sample measuring table and the interval between the plates was set to 0.1 mm. After that, the slurry was sheared at a shear rate of $10^{-1}$ (1/s) at the start and the shear rate was raised up to $10^3$ (1/s). In succession, the slurry was kept at a fixed shear rate of $10^3$ (1/s) for 3 minutes. Then, the shear rate was, on the contrary, reduced from $10^3$ (1/s) to $10^{-1}$ (1/s) during which the viscosity of the slurry was measured. Next, among the viscosities measured while decreasing the shear rate, the viscosity measured at a shear rate of $10^1$ (1/s) is described as the slurry viscosity shown in Table 1. An example of measurement of viscosity is shown in FIG. 10. In FIG. 10, the abscissa is the shear rate (1/s) and the ordinate is the viscosity (mPas). Among the results of the measurement of viscosity-shear rate characteristic of the slurry measured according to the above procedures in Example 1, the results measured during the course of reducing the shear rate from $10^3$ (1/s) to $10^{-1}$ (1/s) are selected and shown in FIG. 10.

Figure 11:
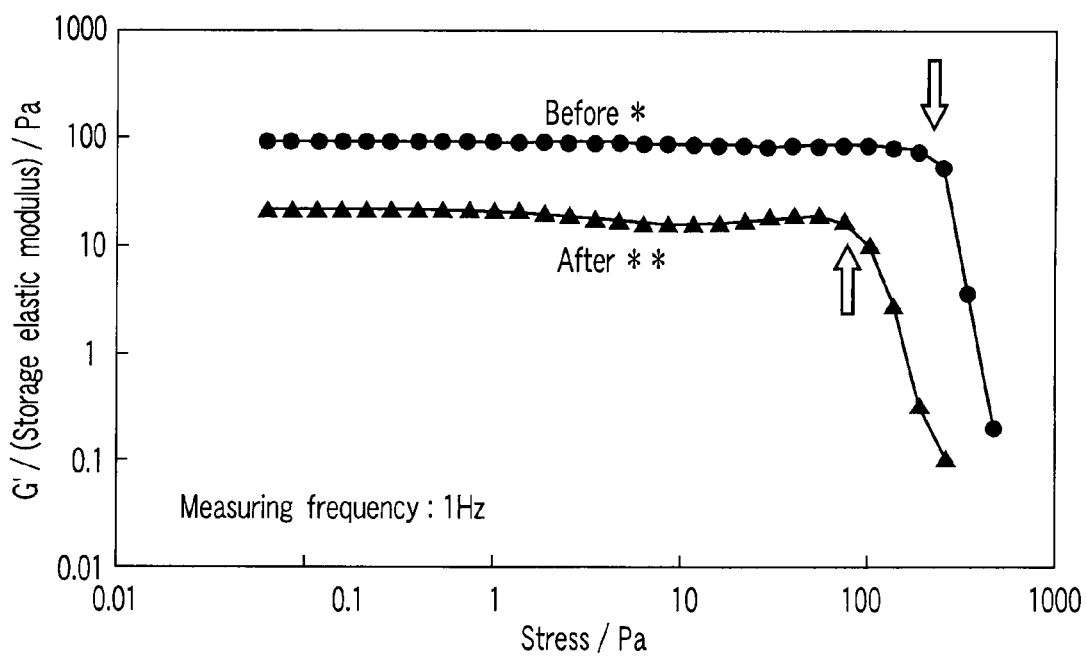
FIG. 11 is a characteristic view showing the relationship between the stress and storage elastic modulus of the slurry in Example 1.

The method of measuring the yield stress will be mentioned. FIG. 11 shows the results of measurement of the yield stress of the slurry in Example 1. In FIG. 11, the abscissa is the stress (Pa) and the ordinate is the storage elastic modulus G' (Pa). First, the slurry is placed on a sample measuring table and the interval between the plates is set to 0.5 mm. Thereafter, the storage elastic modulus G' of the slurry is measured at a frequency of 1 Hz and a stress changed from 0.05 Pa to 1000 Pa. The storage elastic modulus G' is independent of stress and almost constant when the stress is low. However, the storage elastic modulus G' sharply reduces when the stress reaches a certain level. The stress at this time is defined as yield stress. In the case of FIG. 11, the stress at the point indicated by the arrow is the yield stress. Also, in the graph shown in FIG. 11, the curve indicated by "Before *" is the result of measurement before the slurry is made to pass through the static mixer 7 and the curve indicated by "After **" is the result of measurement after the slurry is made to pass through the static mixer 7.

The flatness was evaluated in the following manner. Specifically, the slurry was applied to a current collector and dried. The weight per unit area of the coating film obtained by drying was measured based on the attenuation factor of soft X-rays, to evaluate the flatness.

Figure 12:
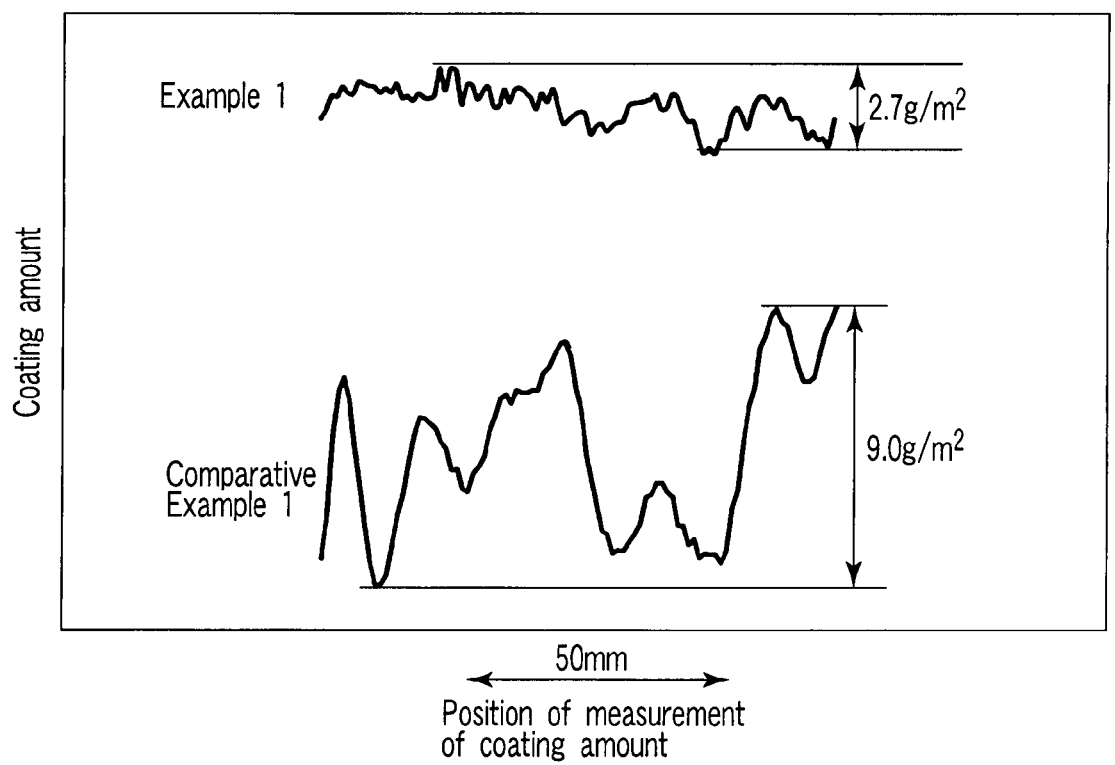
FIG. 12 is a characteristic view showing the distribution of coating amount per unit area in coating films obtained in Example 1 and Comparative Example 1.

Soft X-rays were irradiated on the coating film in an area 5 mm×5 mm in size to measure the radiation dosage of transmitted soft X-rays by a radiation dosage measuring device disposed on the side opposite with respect to the coating film. Then, the attenuation factor was found from a difference between the dosage of X-rays transmitted when no coating film was present and the dosage of X-rays transmitted when the coating film was present. The attenuation factor was compared with that of a coating film formed in a predetermined coating amount, thereby calculating the coating amount of the coating film. At this time, the attenuation factor of an aluminum foil uncoated with any material was measured in advance by using the same method and the attenuation factor of the aluminum foil part was deleted to thereby calculate only the coating amount of the coating film. The coating amount was measured at intervals of 1 mm on the coating film. Then, a difference between the maximum and minimum of the coating amount was read as a standard expressing the flatness. FIG. 12 shows the results of the evaluation of the flatness in Example 1 and Comparative Example 1.

EXAMPLE 2

After the test of Example 1, the pump was suspended for one hour to stop the flow of the slurry and then allowed to operate again to evaluate each value of X1, X2 and A and the flatness as in Example 1. The results are shown in Table 1.

EXAMPLE 2-1

After the test of Example 1, the pump was suspended for two hours to stop the flow of the slurry and then allowed to operate again to evaluate each value of X1, X2 and A and the flatness as in Example 1. The results are shown in Table 1.

EXAMPLE 3

After the test of Example 1, the pump was suspended for five hours to stop the flow of the slurry and then allowed to operate again to evaluate each value of X1, X2 and A and the flatness as in Example 1. The results are shown in Table 1.

EXAMPLES 4 TO 6

A nonaqueous electrolyte battery electrode was manufactured in the same manner as in Example 1 except that the value calculated from the equation, {(L₂/L₁)×100} was set to those shown in the following Table 1.

COMPARATIVE EXAMPLE 1

A nonaqueous electrolyte battery electrode was manufactured in the same manner as in Example 1 except that the static mixer was not used.

TABLE 1

| | Active material | | | | | | | | | Flatness evaluation result |
|---|---|---|---|---|---|---|---|---|---|---|
| | Average particle diameter D50 (μm) | Specific surface area (m²/g) | Slurry viscosity (mPa·s) | Yield stress/Pa | | | Yield stress regulator | $(L_2/L_1) \times 100$ | A | (difference between maximum and minimum) |
| | | | | Before * X1 | After ** X2 | Reduction rate | | | | |
| Example 1 | 0.9 | 8 | 2300 | 200 | 90 | 0.45 | Static mixer | 1 | 0 | 2.7 |
| Example 2 | 0.9 | 8 | 2300 | 200 | 90 | 0.45 | Static mixer | 1 | 10 | 3.4 |
| Example 2-1 | 0.9 | 8 | 2300 | 200 | 90 | 0.45 | Static mixer | 1 | 20 | 4.1 |
| Example 3 | 0.9 | 8 | 2300 | 200 | 90 | 0.45 | Static mixer | 1 | 50 | 6.3 |
| Example 4 | 0.9 | 8 | 2300 | 200 | 90 | 0.45 | Static mixer | 4 | 0 | 3.6 |
| Example 5 | 0.9 | 8 | 2300 | 200 | 90 | 0.45 | Static mixer | 5 | 0 | 4.2 |
| Example 6 | 0.9 | 8 | 2300 | 200 | 90 | 0.45 | Static mixer | 7 | 5 | 6.1 |
| Comparative Example 1 | 0.9 | 8 | 2300 | 200 | — | — | (None) | — | — | 9.0 |

As shown in Examples 1 to 6, the coating film obtained by applying the slurry reduced in yield stress to two-thirds by the yield stress regulator and by drying the slurry is clearly more improved in flatness than in the case of using no yield stress regulator as shown in Comparative Example 1.

It is understood from a comparison between Examples 1 to 3 that Examples 1, 2 and 2-1 having A of 20 or less are superior in flatness to Example 3 having A exceeding 20. Also, it is understood from a comparison between Examples 1 and 4 to 6, Examples 1, 4 and 5 in which the value calculated from the equation, $\{(L_2/L_1) \times 100\}$ is 5 or less is superior in flatness to Example 6 in which the value calculated from the equation, $\{(L_2/L_1) \times 100\}$ exceeds 5. This is considered to be because the yield stress of the slurry in the die coater was kept low as it was since the distance to the die coater was shortened.

EXAMPLE 7

A nonaqueous electrolyte battery electrode was manufactured in the same manner as in Example 1 except that a metal mesh having a mesh size of #270 when 8 mesh sheets were overlapped was used in place of the static mixer used in Example 1.

EXAMPLE 8

A nonaqueous electrolyte battery electrode was manufactured in the same manner as in Example 1 except that the active material, slurry viscosity, yield stress, yield stress regulator and value calculated from the equation, $\{(L_2/L_1) \times 100\}$ were set to those shown in the following Table 2.

TABLE 2

| | Active material | | | | | | | | | Flatness evaluation result |
|---|---|---|---|---|---|---|---|---|---|---|
| | Average particle diameter D50 (μm) | Specific surface area (m²/g) | Slurry viscosity (mPa·s) | Yield stress/Pa | | | Yield stress regulator | $(L_2/L_1) \times 100$ | A | (difference between maximum and minimum) |
| | | | | Before * X1 | After ** X2 | Reduction rate | | | | |
| Example 7 | 0.9 | 8 | 2300 | 200 | 110 | 0.55 | Laminated 8 meshes | 1 | 0 | 3.2 |
| Example 8 | 0.9 | 8 | 2300 | 200 | 130 | 2/3 (0.65) | Laminated 4 meshes | 1 | 0 | 6.4 |
| Comparative Example 1 | 0.9 | 8 | 2300 | 200 | — | — | (None) | — | — | 9.0 |

As shown in Table 2, even in the case of using a mesh as the yield stress regulator, the coating film obtained by applying the slurry reduced in yield stress to two-thirds and by drying the slurry is more improved clearly in flatness than in the case of using no yield stress regulator as shown in Comparative Example 1.

EXAMPLE 9

A nonaqueous electrolyte battery electrode was manufactured in the same manner as in Example 1 except that lithium titanate having an average particle diameter of 0.6 μm and a specific surface area of 25 m²/g was used as the active material.

COMPARATIVE EXAMPLE 2

A nonaqueous electrolyte battery electrode was manufactured in the same manner as in Example 9 except that the static mixer was not used.

EXAMPLE 10

A nonaqueous electrolyte battery electrode was manufactured in the same manner as in Example 1 except that lithium-cobalt oxide having an average particle diameter of 4 μm and a specific surface area of 0.8 m$^2$/g was used as the active material for a nonaqueous electrolyte battery.

COMPARATIVE EXAMPLE 3

A nonaqueous electrolyte battery electrode was manufactured in the same manner as in Example 10 except that the static mixer was not used.

TABLE 3

| | Active material | | Slurry viscosity (mPa·s) | Yield stress/Pa | | | Yield stress regulator | $(L_2/L_1) \times 100$ | A | Flatness evaluation result (difference between maximum and minimum) |
|---|---|---|---|---|---|---|---|---|---|---|
| | Average particle diameter D50 (μm) | Specific surface area (m$^2$/g) | | Before * X1 | After ** X2 | Reduction rate | | | | |
| Example 9 | 0.6 | 25 | 6700 | 850 | 180 | 0.21 | Static mixer | 1 | 3 | 3.5 |
| Comparative Example 2 | 0.6 | 25 | 7000 | 850 | — | — | (None) | — | — | 10.2 |
| Example 10 | 4 | 0.8 | 2400 | 70 | 68 | 0.97 | Static mixer | 1 | 0 | 4.8 |
| Comparative Example 3 | 4 | 0.8 | 2400 | 70 | — | — | (None) | — | — | 5.0 |

As shown in Table 3, Example 9 using the active material having an average particle diameter of 1 μm or less is decreased in the yield stress of the slurry to two-thirds or less, whereby it is improved more outstandingly in flatness than Comparative Example 2. On the other hand, Example 10 using the active material having a particle diameter exceeding 1 μm was almost not changed in the yield stress of the slurry even if a yield stress regulator was used. In such a case, the flatness of the coating film obtained after the slurry is applied and dried was not different whether the yield stress regulator was used or not. This shows that a slurry exists which is not changed in yield stress even if it is passed through an apparatus such as a static mixer. It is inferred that such characteristics of the slurry also relates to the characteristics such as shape and composition of the particles, the type of solvent and the composition of the binder. Particularly, the shape of the particles in the slurry has a large influence on the characteristics of the slurry. This is because reaggregation of the particles in the slurry is considered to be one of the causes why the slurry has a yield stress and the degree of the reaggregation is considered to be dependent largely on the size and shape of the particles. From the result shown in Table 3, the average particle diameter of the nonaqueous electrolyte battery active material contained in the slurry is more preferably 1 μm or less in order for the apparatus of this embodiment to have an intended effect. In addition, the specific surface area of the nonaqueous electrolyte battery active material is more preferably 4 m$^2$/g or more.

EXAMPLE 11

Nonaqueous electrolyte batteries using each of the electrodes obtained in Examples 1 to 8 as a negative electrode were produced in the methods explained below.

<Production of Positive Electrode>

First, 90% by weight of a lithium-cobalt oxide (LiCoO$_2$) powder as a positive electrode active material, 5% by weight of acetylene black as a conductive agent and 5% by weight of polyvinylidene fluoride (PVdF) were added to N-methylpyrrolidone (NMP) and these components were mixed to prepare a slurry. This slurry was applied to both surfaces of a current collector made of an aluminum foil having a thickness of 15 μm, followed by drying and pressing, to thereby manufacture a positive electrode.

<Preparation of Liquid Nonaqueous Electrolyte>

1.5 mol/L of LiBF$_4$ was dissolved in a mixture solvent obtained by mixing ethylene carbonate (EC), propylene carbonate (PC) and γ-butyrolactone (GBL) in a ratio by volume of 1:1:2, to prepare a liquid nonaqueous electrolyte.

<Production of Electrode Group>

A positive electrode, a separator made of a polyethylene porous film having a thickness of 25 μm, a negative electrode and a separator were laminated in this order and coiled spirally. This coiled product was pressed at 90° C. under heating to thereby manufacture a flat-shape electrode group having a width of 30 mm and a thickness of 3.0 mm. The obtained electrode group was received in a pack made of a 0.1-mm-thick laminate film constituted of a 40-μm-thick aluminum foil and a polypropylene layer formed on both surfaces of the aluminum foil, and dried at 80° C. under vacuum for 24 hours.

The liquid nonaqueous electrolyte was poured into the laminate film pack receiving the electrode group and then, the pack was sealed by heat sealing, to thereby manufacture a nonaqueous electrolyte secondary battery having a structure shown in FIG. 5 and having a width of 35 mm, a thickness of 3.2 mm and a height of 65 mm.

The obtained battery was subjected to a test to evaluate the large-current performance by the method explained below. The results are shown in Table 4.

<Evaluation of Large-Current Performance>

Full charge and discharge were repeated under a current corresponding to 20 C. At this time, discharge capacity maintenance ratio: $(Q2/Q1) \times 100(\%)$ was measured from the ratio of a discharge capacity Q2 obtained in the 1000th discharge operation to a discharge capacity Q1 obtained in the first discharge operation.

TABLE 4

|  | Discharge capacity maintenance ratio (%) | Flatness evaluation result |
|---|---|---|
| Example 1 | 80 | 2.7 |
| Example 2 | 76 | 3.4 |
| Example 3 | 68 | 6.3 |
| Example 4 | 77 | 3.6 |
| Example 5 | 74 | 4.2 |
| Example 6 | 71 | 6.1 |
| Example 7 | 78 | 3.2 |
| Example 8 | 70 | 6.4 |

As is clear from Table 4, it is found that the discharge capacity maintenance ratio is more improved, as the value of the evaluation result of flatness is smaller. This is thought to be because, in the case where the value of the evaluation result of flatness is larger, that is, the electrode coating amount is relatively uneven, so that there are places where coating amount is large and places where coating amount is small, this gives rise to easy current concentration in the place where coating amount is small, which promotes deterioration of the coating film. Particularly, when charge-discharge operations are repeated under a large current, this difference appears significantly. Therefore, an electrode more reduced in the value of the flatness evaluation result enables the production of a battery having a high capacity maintenance ratio and long battery life even if charge-discharge operations are carried out under a large current.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of producing a negative electrode, comprising:
    mixing a negative electrode active material, a conductive agent, a binder and a solvent to make a slurry;
    reducing a yield stress of the slurry from a yield stress X1 to a yield stress X2 by passing the slurry through a static mixer or a mesh filter as a yield stress regulator, where X2 is two-thirds or less of X1; and
    applying the slurry to a current collector with a die-coater, wherein
    the method satisfies the following equation (I):

$$0 \leq \{(X3-X2)/(X1-X2)\} \times 100 \leq 20 \quad (I)$$

where X3 is a yield stress of the slurry when the slurry is applied to the current collector using the die-coater, and said reducing comprises passing the slurry from a feeder pump to a die coater through the yield stress regulator, wherein the length from the feeder pump to the die coater is $L_1$, wherein the length from the yield stress regulator to the die coater is $L_2$, and wherein a ratio of $L_2/L_1$ satisfies formula (II):

$$(L_2/L_1) \times 100 \leq 5.$$

2. The method according to claim 1, wherein $$0 \leq \{(X3-X2)/(X1-X2)\} \times 100 \leq 10.$$

3. The method according to claim 1, wherein the slurry has a yield stress exceeding 50 Pa before the yield stress X1 is reduced to the yield stress X2.

4. The method according to claim 1, wherein the slurry has a viscosity of from 1,000 to 100,000 mPa·s after the yield stress X1 is reduced to the yield stress X2.

5. The method according to claim 1, wherein the negative electrode active material is lithium-titanium oxide.

6. The method according to claim 1, wherein the negative electrode active material has an average particle diameter of 5 μm or less.

7. The method according to claim 1, wherein the negative electrode active material has a specific surface area of 0.5 m²/g or more.

8. The method according to claim 1, wherein an electrode obtained by the method comprises an electrode layer comprising the negative electrode active material, and the electrode layer has a thickness of 10 μm or more and 130 μm or less.

9. The method according to claim 1, wherein the yield stress regulator is a static mixer.

10. The method according to claim 1, wherein a ratio by weight of a total amount of the active material, conductive agent and binder to an amount of the solvent is 50:50 to 80:20.

11. The method according to claim 1, wherein the negative electrode active material comprises at least one member selected from the group consisting of a spinel lithium-titanium composite oxide represented by $Li_{4+x}Ti_5O_{12}$ and a rhamsdelite lithium-titanium composite oxide represented by $Li_{2+y}Ti_3O_7$, where $0 \leq x \leq 3$, and $0 \leq y \leq 3$.

12. The method according to claim 1, wherein the yield stress regulator is a mesh filter comprising from 4 to 10 mesh sheets, each sheet having a mesh size of from #100 to #300.

13. The method according to claim 1, wherein the slurry consists of said negative electrode active material, conductive agent, binder and solvent throughout the method.

14. A method of producing a nonaqueous electrolyte battery comprising a positive electrode, a negative electrode and a nonaqueous electrolyte, where the negative electrode is produced by a process comprising:
    mixing a negative electrode active material, a conductive agent, a binder and a solvent to make a slurry;
    reducing a yield stress of the slurry from a yield stress X1 to a yield stress X2 by passing the slurry through a static mixer or a mesh filter as a yield stress regulator, where X2 is two-thirds or less of X1; and
    applying the slurry to a current collector with a die-coater, wherein
    the process satisfies the following equation (I):

$$0 \leq \{(X3-X2)/(X1-X2)\} \times 100 \leq 20 \quad (I)$$

where X3 is a yield stress of the slurry when the slurry is applied to the current collector using the die-coater, and said reducing comprises passing the slurry from a feeder pump to a die coater through the yield stress regulator, wherein the length from the feeder pump to the die coater is $L_1$, wherein the length from the yield stress regulator to the die coater is $L_2$, and wherein a ratio of $L_2/L_1$ satisfies formula (II):

$$(L_2/L_1) \times 100 \leq 5.$$

15. The method according to claim 14, wherein $$0 \leq \{(X3-X2)/(X1-X2)\} \times 100 \leq 10.$$

16. The method according to claim 14, wherein the slurry has a yield stress exceeding 50 Pa before the yield stress X1 is reduced to the yield stress X2.

17. The method according to claim 14, wherein the slurry has a viscosity of from 1,000 to 100,000 mPa·s after the yield stress X1 is reduced to the yield stress X2.

18. The method according to claim 14, wherein the negative electrode active material is lithium-titanium oxide.

19. The method according to claim 14, wherein the negative electrode active material has an average particle diameter of 5 μm or less.

20. The method according to claim 14, wherein the negative electrode active material has a specific surface area of 0.5 $m^2/g$ or more.

21. The method according to claim 14, wherein the negative electrode comprises an electrode layer comprising the active material, and the electrode layer has a thickness of from 10 to 130 μm.

22. The method according to claim 14, wherein the yield stress regulator is a static mixer.

23. The method according to claim 14, wherein a ratio by weight of a total amount of the active material, conductive agent and binder to an amount of the solvent is 50:50 to 80:20.

24. The method according to claim 14, wherein the negative electrode active material comprises at least one member selected from the group consisting of a spinel lithium-titanium composite oxide represented by $Li_{4+x}Ti_5O_{12}$ and a rhamsdelite lithium-titanium composite oxide represented by $Li_{2+y}Ti_3O_7$, where $0 \leq x \leq 3$, and y $0 \leq y \leq 3$.

25. The method according to claim 14, wherein the slurry consists of said negative electrode active material, conductive agent, binder and solvent throughout the method.

* * * * *